No. 720,694. PATENTED FEB. 17, 1903.
L. J. R. HOLST.
PHOTOGRAPHIC CAMERA.
APPLICATION FILED AUG. 27, 1901.
NO MODEL. 3 SHEETS—SHEET 2.

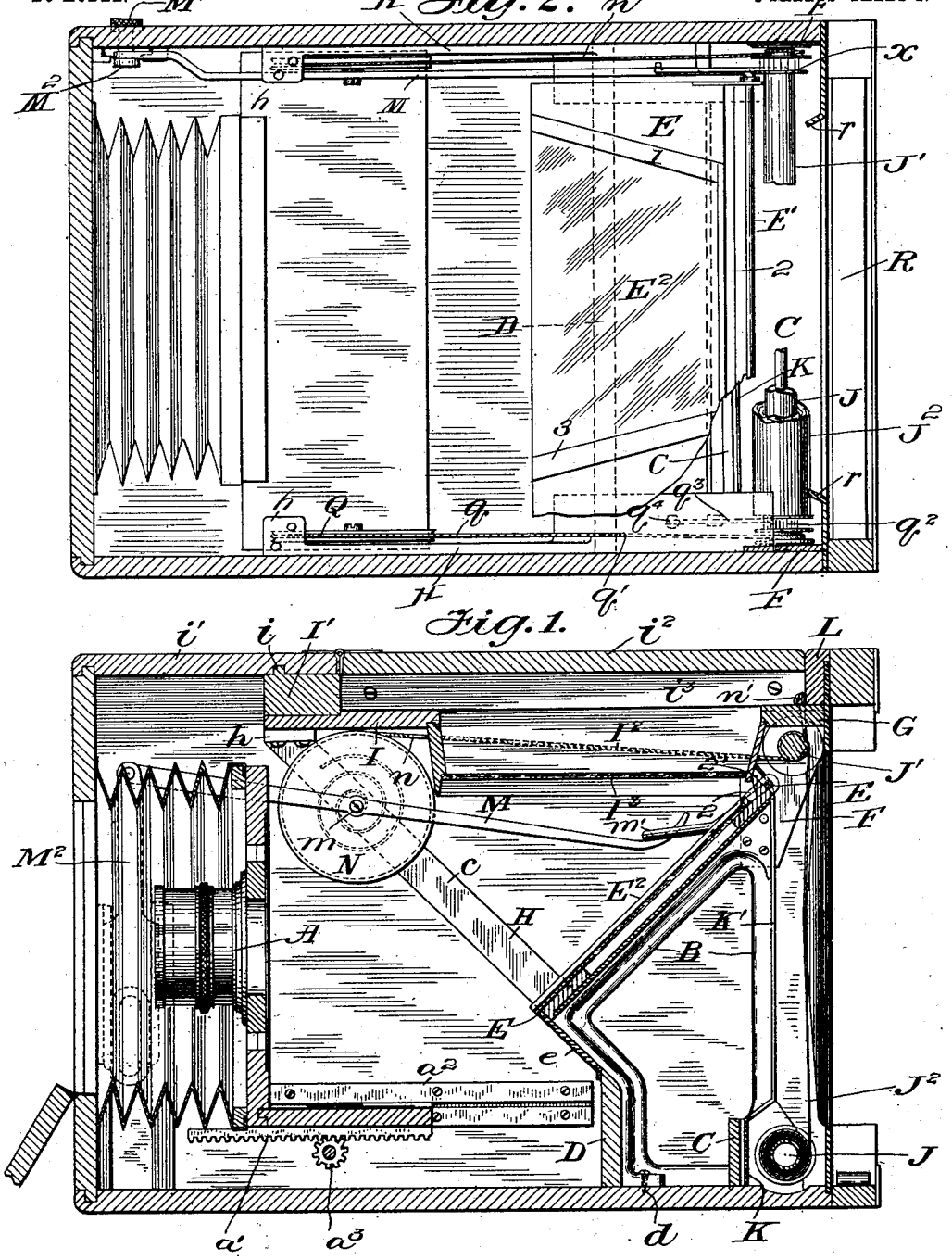

Witnesses Inventor
L. J. R. Holst
By Attorneys
Baldwin, Davidson & Wight

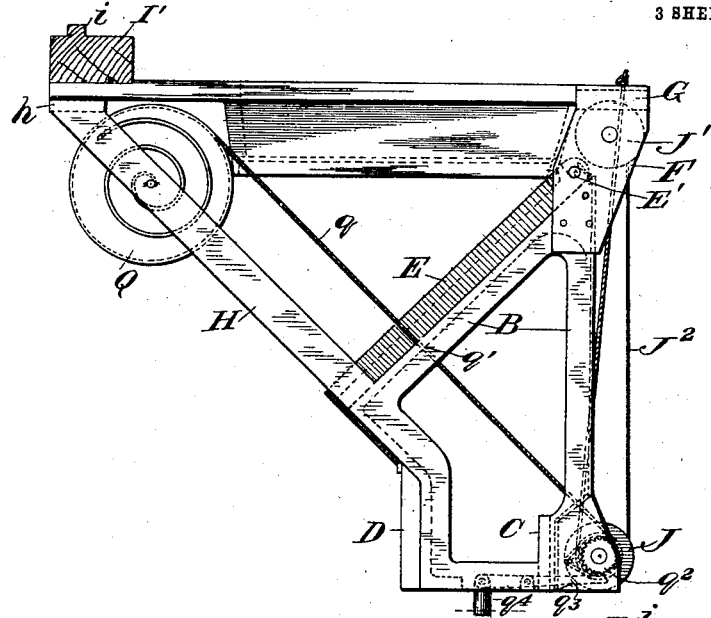
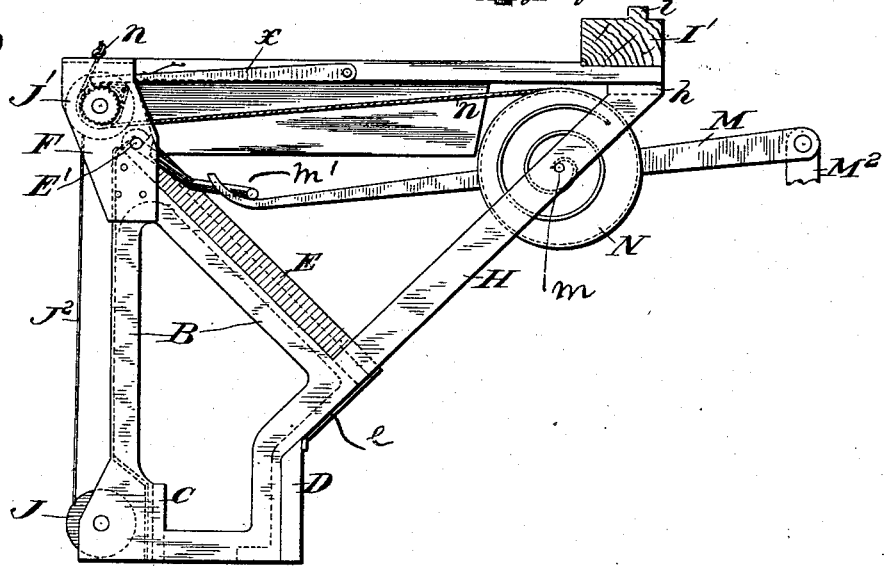

UNITED STATES PATENT OFFICE.

LODEWYK JAN RUTGER HOLST, OF BROOKLYN, NEW YORK, ASSIGNOR OF TWO-THIRDS TO LOUIS BORSUM, OF PLAINFIELD, NEW JERSEY.

PHOTOGRAPHIC CAMERA.

SPECIFICATION forming part of Letters Patent No. 720,694, dated February 17, 1903.

Application filed August 27, 1901. Serial No. 73,425. (No model.)

*To all whom it may concern:*

Be it known that I, LODEWYK JAN RUTGER HOLST, a subject of the Queen of the Netherlands, (but having declared my intention of becoming a citizen of the United States and having taken out my first naturalization-papers,) residing in the borough of Brooklyn, in the city of New York, State of New York, have invented certain new and useful Improvements in Photographic Cameras, of which the following is a specification.

This invention relates to cameras of the class in which movable-mirror finders located between the shutter and the lens are employed and in which the mirror is moved out of the way immediately preceding the tripping of the shutter.

The purpose of the invention is to provide an organization which will facilitate the assembling of the different parts of the camera, afford a ready means of access to all of its parts for repair or adjustment, and maintain the parts, including the finder and shutter devices, in proper position or relation irrespective of distortion of the camera-box due to warping or other causes. These ends are accomplished by the organization hereinafter set forth, which includes in addition to those mentioned certain other features of construction related thereto.

Figure 7:
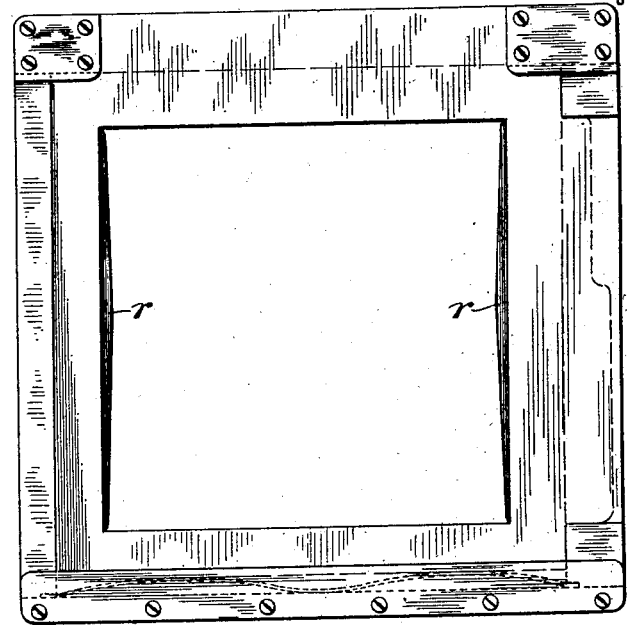
Figure 3:
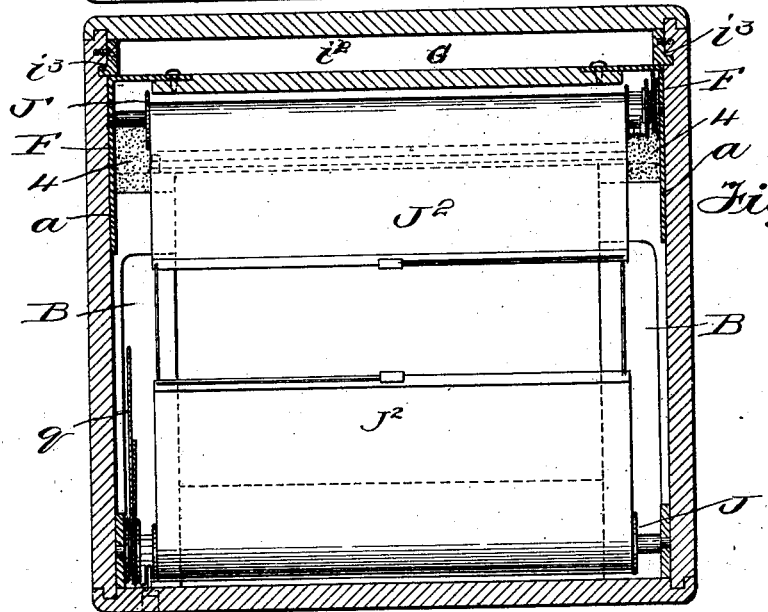
Figures 4, 5, 6:

In the accompanying drawings, Figure 1 is a vertical longitudinal central section; Fig. 2, a view in horizontal section, taken just below the cover and just above the upper shutter-roll, some of the parts being removed and some being broken away in order to better illustrate other parts; Fig. 3, a transverse vertical section taken just in rear of the shutter. Figs. 4, 5, and 6 are detail views showing devices that may be employed for tripping the shutter and adjusting the tension of the shutter spring drum or roll. Fig. 7 is an elevation of the plate-holder. Fig. 8 shows an elevation of one side of the separable supporting-frame carrying the shutter, the finder devices, the tripping-lever, and other associated parts. Fig. 9 is an elevation of the opposite side thereof.

The ordinary camera-box is provided with appropriate openings and doors, as usual or as may be desirable.

A is an ordinary objective, which may be mounted and adjusted in any suitable way. As shown, the objective carries a rack $a'$, guided by a guide-plate $a^2$. A pinion $a^3$ gears with the rack, and the shaft of the pinion may carry a handle of any suitable construction. Heretofore in cameras of this class the finder and shutter and associated parts have been independently mounted within the box and appropriately secured to the bottom and sides thereof. Such a mode of construction involves considerable labor in assembling and presents also difficulties when repairs are required.

The primary feature of the present invention consists in employing a rigid frame, which is preferably of metal and which may be formed of one or more pieces. The shutter, finder devices, and tripping-lever also, if desired, are all mounted and adjusted in this frame, which is afterward seated and properly secured within the box or casing, so that it may be readily removed whenever desired. The frame may be carried by the top board of the box and the two parts placed in position at the same time.

Of course the structure of the frame may be considerably varied. The preferred construction is, however, as follows: Two skeleton side pieces B, which may be of cast metal, are cross-connected at the bottom by a cross-piece C, preferably cast with them, and by a transverse light-guard wall D, against which the front flange $e$ of the finder-frame abuts, as usual, when the latter is depressed. The side pieces are shaped to support the mirror-finder frame E at the proper angle, and at their upper ends angle-plates F are bolted to them and also to a cross-piece G. Extending upwardly and forwardly from the side pieces and preferably formed integrally with them are arms H, bolted at the top at $h$ to a cross piece or board I, which is secured in turn to a cross-bar $I'$, located above it. The light-well $I^2$ of the finder is supported by the cross-bar G and cross-board I. If desired, the frame thus far described may be secured to the bottom of the camera-box, as indicated at $d$, Fig. 1. The lower curtain-roll or spring-drum J is mounted in bearings in the side pieces B, and the upper roll $J'$ is similarly mounted in the angle-plates F. J² is the ordinary curtain-shutter wound on these rolls. The light-guard frame E is hinged upon a rod E', mounted between the upper ends of the side pieces, or it may be between the angle-pieces F. It is formed, as usual, with grooves 1 2 3 at the sides and back of the mirror E², into which enter the edges of the light-well extending below the ground glass I³ when the frame E is elevated. The rear wall of the rear groove 2 is somewhat raised and beveled or inclined toward the rear, so as to coöperate with the rear edge or wall 2' of the light-well to prevent passage of light-rays toward the shutter. To further protect the shutter from light-rays, a flexible light-guard 4, (see Fig. 3,) which may be plush, velvet, leather, or other suitable material, is attached to the wall 2' and bears against the rod E'. Ordinary bottom and side light-guard strips, composed of a transverse bottom part K and vertical side parts K', are attached to the side pieces B. The transverse bar G, forming the upper rear edge of the frame that has been described, fits closely under a strip L, forming part of the camera-box and rigidly attached to the sides thereof. The transverse bar I' may be formed with a rib $i$, fitting in a corresponding groove in the top board $i'$. It will be apparent that when the frame is placed in position secured to the bottom of the box at $d$ and the top board secured in place the frame and all the parts carried by it will be firmly held in fixed relation to each other and to the camera-box. To further secure the frame in place, I prefer to place just inside the light-well opening, of which $i^2$ is the cover, strips $i^3$, screwed to the sides of the box and bearing upon the cross-board I and the cross-bar G. It will be obvious that the frame may readily be detached and removed. The lever M for lifting the mirror-frame and then tripping the shutter may be pivoted at $m$ upon the part H of one of the side pieces, and by disconnecting the tripping slide or button M' from the link M², connected with the front end of the lever, the lever may also be removed with the frame.

In Fig. 1 the link M² is shown by dotted lines. The slide or button engages the lower end of this link, and by properly manipulating the button the front end of the lever M may be lowered and raised to correspondingly raise and lower the mirror. The rear end of the lever M has a sliding connection with a loop $m'$, attached to the mirror-frame. The upper shutter-roll J' is normally held against rotation by a pawl $x$, pivoted to the top of the frame and engaging a ratchet-wheel on the shaft of the roller. After the lever M has raised the mirror it engages the pawl $x$ and releases it from the ratchet.

It is obvious that the rigid frame composed of the several separate parts mentioned may be of integral construction and that the light-well, shaft, shutter devices, mirror-finder frame, light-guards, and tripping-lever may all with facility be assembled within or upon the frame and the frame then placed in position in the box and secured as described. This mode of construction is of course a large saving of labor and possesses other advantages, some of which have been suggested. The cross-bar I' and the top board of the box may be rigidly united, if desired, so that by loosening the top board, removing the strips $i^3$, and the screws $d$ the top board and the frame may be lifted from the box.

It will be apparent that in a camera constructed according to the principle described some means of winding up the shutter and regulating the tension of the shutter spring-drum must be adopted that will permit of the assembling of the apparatus and the removal when desired of the frame. Instead of employing at the side of the camera removable buttons having spindles or parts that pass through apertures in the side walls and properly engage the two shutter-rolls I have adopted a construction in which the devices for regulating the tension of the shutter and for winding it are all carried upon the removable frame.

Preferably the construction is as follows: At one side of the frame on the part H is mounted a spring-drum N. A cord $n$, wound around it and having one end attached to it, passes to the upper or winding roll J' of the shutter, thence up through an aperture in the cross-bar G, where it is formed with a head or knot $n'$, where it is conveniently accessible when the cover $i^2$ is lifted. Referring to Figs. 4, 5, and 6, it will be seen that the cord $n$ passes once around a sleeve O on one end of the roll J', thence over or around a laterally-projecting pin $o$ in the end of a pivoted pawl O', from whence it passes up through the aperture in the cross-bar G, as shown in Fig. 1. The sleeve O has a circular flange O², upon which the pawl is pivoted and which carries a spring O³, bearing on the farther end of the pawl and normally tending to throw its other end out of engagement with a ratchet-wheel P, fast on the roll. The pin $o$ travels in a slot $o'$ in the circular flange. The shutter is wound by seizing the knot or head $n'$ and drawing up the cord, thereby engaging the pawl O' with the ratchet-wheel P and rotating the roll J'. When the cord is released, it is rewound upon the spring-drum N; but the end being slack the spring O³ is permitted to press the pawl out of engagement with the ratchet-wheel. The roll J' is dogged, of course, by the ordinary tripping-latch $x$, already referred to. This operation is repeated as often as is necessary to wind the shutter. Of course the arrangement may be such that the shutter may be fully wound by one manipulation of the cord. As will be seen in Fig. 2, the cord $n$ passes from the spring-drum to the roll J' along the space between the side of the light-well and the wall of the box. The tension of the shutter is adjusted by a similar arrangement, (shown in Fig. 8,) Q being the spring-drum, mounted on the part H of the other side piece of the frame, and $q$ the cord running therefrom and passing through an aperture at $q'$ in the inclined part of the frame normally supporting the finder-frame, from whence the cord passes around a sleeve loosely mounted on the spindle of the spring of the lower roll or drum J, from whence it passes upwardly through an aperture in the cross-bar thereof. The arrangement is the same in all respects, as already described, and shown in Figs. 4, 5, and 6, except that of course the spindle of the spring is wound to adjust its tension. A ratchet-wheel $q^2$, Figs. 2 and 8, on the spring-drum spindle is engaged by a pivoted detent latch or dog $q^3$ to maintain the tension of the spring when adjusted in the manner described. The farther end of this latch carries a small button projecting into an aperture in the bottom plate of the camera, as indicated by the dotted lines $q^4$, Figs. 2 and 8, and also in Fig. 3. By pressing on this button the latch may be disengaged from the wheel $q^2$, when the spindle of the spring-roll J will react and reëstablish the normal tension.

In rear of the shutter is the plate-holder-receiving chamber R, at the sides of which are inwardly-projecting flanges $r$, against the inner edges of which the curtain-shutter travels. These flanges are, as shown, preferably of greatest width at their central parts midway between the shutter-rolls and are of diminishing width toward their upper and lower ends, the purpose of thus shaping them being to properly separate the curtain to prevent its fluttering.

I claim as my invention—

1. In a photographic camera, the combination with the box, of a frame removably seated in the box, the focal-plane shutter and finder devices mounted upon the frame and removable therewith, and the lever, for lifting the finder and stripping the shutter, pivoted on the frame.

2. In a photographic camera, the combination of the box, a frame removably seated in the box, and, finder devices, focal-plane-shutter rolls, the finder light-shaft, and the lever for lifting the finder and tripping the shutter, all mounted on the frame and removable therewith.

3. In a photographic camera, the combination with the box, of a frame constructed independently of the box, the focal-plane shutter, finder and associated parts mounted in the frame, the frame, after assemblage of the parts thereon, being adapted to be seated within the box between the objective and the plate-holder chamber, and the lever, for lifting the finder and tripping the shutter, pivoted on the frame.

4. In a photographic camera, the combination of the box, an independently-constructed frame adapted to be removably seated in the box, the focal-plane shutter and finder devices mounted on the frame, means for winding the focal-plane shutter also mounted on the frame, and the lever, for lifting the finder and tripping the shutter, pivoted on the frame.

5. In a photographic camera, the combination of the box, a separately-constructed frame adapted to be removably seated within the box, the finder devices and focal-plane-shutter rolls mounted in the frame, a cord for winding the focal-plane shutter and its spring-drum also mounted on the frame.

6. In a photographic camera, the combination of the box, the separately-constructed frame adapted to be removably seated within the box, the finder devices and focal-plane-shutter rolls mounted in the frame, the cord for winding the shutter and its spring-drum also mounted on the frame, and the cord for adjusting the tension of the focal-plane shutter and its spring-drum also mounted on the frame.

7. In a photographic camera, the combination of the box, a frame removably seated in the box, focal-plane-shutter rolls mounted in the frame, a sleeve applied loosely to one of the rolls, a ratchet-wheel on the roll-shaft, a pawl on the sleeve adapted to engage the ratchet, a cord passing around the sleeve and over the pin on the pawl, and the spring-drum on the frame to which the cord is attached whereby a pull upon the cord rotates the winding-roll and, when the cord is released, the spring-drum takes it up again without its operating upon the roll.

8. In a photographic camera, the combination with the box, of a frame removably seated in the box, and the focal-plane shutter and finder devices mounted upon the frame and removable therewith.

9. In a photographic camera, the combination of the box, a frame removably seated in the box, and, finder devices, shutter-rolls and the finder light-shaft, mounted on the frame and removable therewith.

10. In a photographic camera, the combination with the box, of a frame constructed independently of the box and the focal-plane-shutter finder and associated parts mounted in the frame, the frame, after assemblage of the parts thereon, being adapted to be seated within the box between the objective and the plate-holder chamber.

11. In a photographic camera, the combination of the box, an independently-constructed frame adapted to be removably seated in the box, the focal-plane shutter and finder devices mounted on the frame and means for winding the focal-plane shutter also mounted on the frame.

In testimony whereof I have hereunto subscribed my name.

LODEWYK JAN RUTGER HOLST.

Witnesses:
KATHARINE MACMAHON,
WILLIAM A. STAHLIN.